United States Patent
Kurata et al.

(10) Patent No.: US 11,465,387 B2
(45) Date of Patent: Oct. 11, 2022

(54) SHEET FORMING BINDER, CONTAINER, SHEET FORMING APPARATUS, SHEET FORMING METHOD, AND POWDER SET

(71) Applicant: SEIKO EPSON CORPORATION, Tokyo (JP)

(72) Inventors: Hiroki Kurata, Nagano (JP); Yoshihiro Ueno, Nagano (JP); Takumi Sago, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 365 days.

(21) Appl. No.: 16/517,797

(22) Filed: Jul. 22, 2019

(65) Prior Publication Data

US 2020/0031090 A1 Jan. 30, 2020

(30) Foreign Application Priority Data

Jul. 24, 2018 (JP) .............................. JP2018-138295

(51) Int. Cl.
| | | |
|---|---|---|
| *B32B 5/02* | (2006.01) | |
| *B28B 3/12* | (2006.01) | |
| *D21H 13/30* | (2006.01) | |
| *C08K 3/22* | (2006.01) | |
| *D21H 21/30* | (2006.01) | |
| *D21H 17/67* | (2006.01) | |
| *D21H 27/00* | (2006.01) | |
| *D04H 1/587* | (2012.01) | |
| *B27N 3/02* | (2006.01) | |
| *B27N 3/04* | (2006.01) | |

(52) U.S. Cl.
CPC .................. *B32B 5/02* (2013.01); *B27N 3/02* (2013.01); *B27N 3/04* (2013.01); *B28B 3/126* (2013.01); *C08K 3/22* (2013.01); *D04H 1/587* (2013.01); *D21H 5/1227* (2013.01); *D21H 5/26* (2013.01); *D21H 13/30* (2013.01); *D21H 17/675* (2013.01); *D21H 21/30* (2013.01); *C08K 2003/2241* (2013.01)

(58) Field of Classification Search
CPC . B27N 3/02; B27N 3/04; D04H 1/587; D04H 1/60; D04H 1/70; D21H 5/26; C08K 3/22
See application file for complete search history.

(56) References Cited

U.S. PATENT DOCUMENTS

| | | | |
|---|---|---|---|
| 2003/0008114 A1* | 1/2003 | Nakanishi | B41M 5/52 |
| | | | 428/195.1 |
| 2008/0122141 A1* | 5/2008 | Bedal | C08J 5/00 |
| | | | 264/405 |
| 2014/0290884 A1 | 10/2014 | Yamagami et al. | |
| 2016/0230320 A1 | 8/2016 | Ueno et al. | |
| 2018/0333892 A1 | 11/2018 | Ueno | |
| 2020/0206970 A1 | 7/2020 | Ueno | |
| 2021/0178631 A1 | 6/2021 | Ueno | |

FOREIGN PATENT DOCUMENTS

| | | |
|---|---|---|
| JP | 2008-088612 A | 4/2008 |
| JP | 2014-208922 A | 11/2014 |
| JP | 2015-092032 A | 5/2015 |
| WO | 2017/086326 A1 | 5/2017 |
| WO | WO-2018025676 A1 * | 2/2018 ............. D04H 1/413 |

OTHER PUBLICATIONS

Google patents translation of WO 2018/025676 (2018, 15 pages).*
Vestosint (Product Overview of Vestosint Polyamide 12 Nylon Powders, Vestosint, 2021, 2 pages).*
Songhan (Arkema Group Orgasol 1002 ES 4 Nat 1 Polyamide 6, Songhan, 2021, 3 pages).*
Mitsuru Ochiai; "Fumed Silica"; Special Issue "Aerosol Industrial Use"; Dec. 12, 1989.

* cited by examiner

*Primary Examiner* — Brieann R Johnston
(74) *Attorney, Agent, or Firm* — Global IP Counselors, LLP (57) ABSTRACT

A sheet forming binder includes a first powder and a second powder having a larger volume average particle size than the first powder. The proportion of the first powder is 10.0% by mass or more relative to the total mass of the first powder and the second powder.

6 Claims, 2 Drawing Sheets

SHEET FORMING BINDER, CONTAINER, SHEET FORMING APPARATUS, SHEET FORMING METHOD, AND POWDER SET

The present application is based on, and claims priority from JP Application Serial Number 2018-138295, filed Jul. 24, 2018, the disclosure of which is hereby incorporated by reference herein in its entirety.

BACKGROUND

1. Technical Field

The present disclosure relates to a sheet forming binder, a container, a sheet forming apparatus, a sheet forming method, and a powder set.

2. Related Art

It has long been known to deposit a fibrous material on a surface and apply a binding force among the fibers of the deposited fibrous material to form the fibrous material into a sheet or a film. A typical example is papermaking using water. Many of the papermaking machines use water, electric power, and large-scale utilities for, for example, drainage and are therefore difficult to downsize. Accordingly, a dry process using no water or hardly using water is desirable to form a sheet as an alternative to the water-suing papermaking.

JP-A-2015-092032 discloses a method for forming a sheet in a dry process, and a composite containing a resin functioning to bind fibers used in the sheet to each other.

The composite disclosed in JP-A-2015-092032 contains a white pigment as a colorant with a high content so as to hide color materials remaining on and among fibers, thereby producing highly white sheets. Unfortunately, in such a composite containing a white pigment with a high content, the resin content is relatively reduced and, accordingly, the strength of the sheet may be reduced in some cases.

SUMMARY

According to an aspect of the present disclosure, there is provided a sheet forming binder including a first powder, and a second powder having a larger volume average particle size than the first powder. The proportion of the first powder is 10.0% by mass or more relative to the total mass of the first powder and the second powder.

In an embodiment of the sheet forming binder, the first powder and the second powder may contain one or both of a pigment and a resin.

In an embodiment of the sheet forming binder, the first powder may contain a fluorescent brightening agent.

In an embodiment of the sheet forming binder, the first powder contains the fluorescent brightening agent with a content of 1% by mass or less relative to the total mass of the first powder.

In an embodiment of the sheet forming binder, the first powder may have a volume average particle size of 5.0 μm or less, and the second powder may have a volume average particle size of 10.0 μm or more.

In an embodiment of the sheet forming binder, the first powder may contain titanium dioxide as an inorganic pigment with a content of 30.0% by mass or more.

In an embodiment of the sheet forming binder, the second powder may contain titanium dioxide as an inorganic pigment with a content of 8.0% by mass or less.

In an embodiment of the sheet forming binder, the second powder may contain no inorganic pigment.

According to another aspect of the present disclosure, a container containing the sheet forming binder is provided. The container includes a first accommodation chamber configured to accommodate the first powder; and a second accommodation chamber configured to accommodate the second powder.

A further aspect of the present disclosure provides a sheet forming apparatus including a mixing section configured to mix fibers having an average diameter D, a first powder having a volume average particle size $d1$, and a second powder having a volume average particle size $d2$ larger than $d1$ in a gas atmosphere to prepare a mixture, a depositing section configured to deposit the mixture, a sheet forming section configured to form the mixture deposited in the depositing section into a sheet by heating the mixture. In this embodiment, $d1/D$ is less than 0.350, and $d2/D$ is from 0.350 to 1.000.

In an embodiment of the sheet forming apparatus, the first powder may be mixed in a proportion of 10.0% by mass or more relative to the total mass of the first powder and the second powder in the mixing section.

A still further aspect of the present disclosure provides a sheet forming method including a mixing step of mixing fibers having an average diameter D, a first powder having a volume average particle size $d1$, and a second powder having a volume average particle size $d2$ larger than $d1$ in a gas atmosphere to prepare a mixture, a depositing step of depositing the mixture, and a sheet forming step of forming the mixture deposited in the depositing step into a sheet by heating the mixture. In this process, $d1/D$ is less than 0.350, and $d2/D$ is from 0.350 to 1.000.

In an embodiment of the sheet forming method, the first powder may be mixed in a proportion of 10.0% by mass or more relative to the total mass of the first powder and the second powder in the mixing step.

A yet another aspect of the present disclosure provides a powder set to be mixed with fibers having an average diameter D before use. The powder set includes a first powder having a volume average particle size $d1$, and a second powder having a volume average particle size $d2$ larger than $d1$, wherein $d1/D$ is less than 0.350, and $d2/D$ is from 0.350 to 1.000.

DESCRIPTION OF EXEMPLARY EMBODIMENTS

Some embodiments of the present disclosure will now be described. The following embodiments illustrate some implementations of the disclosure. The implementation of the subject matter of the disclosure is not limited to the following embodiments, and various modifications may be made within the scope and spirit of the disclosure. All the components disclosed in the following embodiments are not necessarily essential for the subject matter disclosed herein.

1. SHEET FORMING BINDER

The sheet forming binder according to an embodiment of the disclosure includes a first powder and a second powder.

1.1. First Powder

The sheet forming binder according to an embodiment of the disclosure includes a first powder. The first powder has a function to color the sheet to be formed. The first powder may also have a function to bind fibers to each other in the sheet. In the sheet forming binder of the present embodiment, the first powder acts mainly to color the sheet, while the second powder, which will be described later herein, acts mainly to bind the fibers to each other in the sheet. The first powder and the second powder each may have other functions.

The volume average particle size of the first powder is smaller than that of the second powder. The volume average particle size of a powder refers to the volume-based average diameter of the particles constituting the powder, that is, the average diameter of the particles weighted by volume. The volume average particle size of the first powder may be less than 10.0 µm and is, for example, 8.0 µm or less, 5.0 µm or less, or 4.0 µm or less.

The volume average particle size of the first powder may be measured with, for example, a particle size distribution analyzer based on a laser diffraction/scattering method. For example, a particle size distribution analyzer using dynamic light scattering (for example, Microtrac (registered trademark) UPA manufactured by Nikkiso) may be used. The volume average particle size may be measured in a state of a suspension prepared by suspending the particles in water with a particle size and shape analyzer for suspensions (FPIA-2000 manufactured by Sysmex).

1.1.1. Constituents of First Powder

The first powder may contain an inorganic pigment, a resin, a fluorescent brightening agent, and an aggregation inhibitor. In some embodiments, the first powder may contain one or both of a pigment and a resin.

Inorganic Pigment

The first powder may contain an inorganic pigment. The inorganic pigment may be selected from among pigments generally used for various colors (white, blue, red, yellow, cyan, magenta, black, special colors such as pearl and metallic luster) in ordinary inks without limitation in terms of color or type. The inorganic pigment may be a white pigment, such as hydrozincite, titanium oxide, antimony white, zinc sulfide, clay, silica, white carbon, talc, or alumina white. Such inorganic pigments may be used singly or may be mixed as needed.

When a white inorganic pigment is used, a powder constituted of pigment particles mainly containing titanium oxide may be used. Titanium oxide has a high refractive index and, accordingly, helps increase the whiteness of the resulting sheet even if the content thereof is low. When titanium oxide is used, titanium dioxide is beneficial. In this instance, the titanium dioxide content in the first powder may be 30.0% by mass or more, for example, 35.0% by mass or more or 40.0% by mass or more, relative to the total mass of the first powder. The upper limit of the titanium dioxide content may be, but is not limited to, 60.0% by mass or less or 50.0% by mass or less.

The inorganic pigment in the first powder may have a function to control the color tone of the resulting sheet. For example, use of such an inorganic pigment enables color sheets varying in color tone to be easily formed in a dry process. Also, use of a white inorganic pigment provides a highly white sheet.

The first powder may consist of an inorganic pigment, or may integrally contain an inorganic pigment and a resin together as will be described later herein. The term "inorganic pigment" used herein may be a powder that is a mass of unit particles of the inorganic pigment (inorganic pigment particles). The term "unit particle (inorganic pigment particle)" used herein refers to a particle that is difficult to pulverize into smaller particles by ordinary pulverization. For example, when the inorganic pigment is a titanium oxide white pigment, a microscopic crystal of titanium oxide is the primary particle of the inorganic pigment, and the unit particle (pigment particle) of the inorganic pigment may be an aggregate of the primary particles. Many of the primary particles in the aggregate are chemically bound to each other or in the form of twins and are difficult to mechanically pulverize. A pigment particle may be a primary particle or an aggregate of primary particles.

Resin

The first powder may contain a resin. The resin may have a function to bind the fibers to each other in the sheet or a function as a carrier of the inorganic pigment. The resin may be a natural resin or a synthetic resin and may be a thermoplastic resin or a thermosetting resin. In some embodiments, a thermoplastic resin may be beneficially used. From the viewpoint of enhancing the water resistance of the sheet, the resin contained in the first powder may be a water-insoluble resin.

Examples of the natural resin include rosin, dammar, mastic, copal, amber, shellac, dragon's blood, and sandarac. Such naturals resins may be used singly or in combination or may be modified as needed. Examples of the synthetic resin include thermosetting resins, such as phenol resin, epoxy resin, melamine resin, urea resin, unsaturated polyester resin, alkyd resin, polyurethane resin, and thermosetting polyimide resin; and thermoplastic resins, such as AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, and polyether ketone. Such synthetic resins may be used singly or may be mixed as needed. The synthetic resin may be copolymerized or modified, and examples of such a resin include styrene-based resin, acryl-based resin, styrene-acrylic copolymer resin, olefin-based resin, vinyl chloride-based resin, polyester-based resin, polyamide-based resin, polyurethane-based resin, polyvinyl alcohol-based resin, vinyl ether-based resin, N-vinyl-based resin, and styrene-butadiene-based resin.

The resin contained in the first powder may melt or soften at 200.0° C. or less. In some embodiments, a resin that melts or softens at 160.0° C. or less may be used in view of energy saving.

While it is beneficial for the resin used in the first powder to have a high glass transition temperature (Tg) in view of resistance to high temperature, a resin having a glass transition temperature appropriate in terms of energy saving and other conditions in manufacture may be selected. The glass transition temperature of the resin may be appropriately selected according to the thickness of the sheet to be formed or the temperature of heat treatment. The glass transition temperature of the resin used in the first powder may be 45.0° C. or more or 50.0° C. or more. Also, the upper limit of the glass transition temperature may be 95.0° C. or less or 90.0° C. or less.

The first powder may be prepared by mixing and kneading the constituents with, for example, a kneader, a banbury mixer, a single-screw extruder, a multi-screw extruder, a two roll mill, a three roll mill, a continuous kneader, a continuous two roll mill, or the like, followed by optionally pelletizing the mixture and appropriately pulverizing the mixture or the pellets. The first powder may include particles having varying particle sizes. Such particles may be sorted by using a known classifier. The shape of the particles in the first powder may be, but is not limited to, spherical, disciform, fibrous, or indefinite.

When the first powder contains a resin and an inorganic pigment, the particles in the first powder may integrally contain the resin and the inorganic pigment together. The state where the resin and the inorganic pigment are integrally contained together suggests that it is difficult to remove the inorganic pigment or the resin from the particles in one or both of the sheet forming apparatus and the resulting sheet. More specifically, the state where the first powder integrally contains the resin and the inorganic pigment together refers to a state where the particles of the inorganic pigment are bound to each other with the resin, a state where the resin particles are structurally fixed to the inorganic pigment, a state where the resin particles and the inorganic pigment particles are aggregated by static electricity, Van der Waals force, or the like, or a state where the resin and inorganic pigment are chemically bound to each other. In such a state, the inorganic pigment may be contained in the resin particles or attached to the resin particles or may be in both states at one time. In some embodiments, the shape of the particles may be, but is not limited to, as spherical as possible. Such particles are likely to be distributed among fibers.

For allowing the resin and the inorganic pigment to be present integrally in the first powder, a known process may be used. For example, the resin may be heated to a temperature more than or equal to the softening temperature of the resin and kneaded with the inorganic pigment in a melt-kneading process, or the resin may be dissolved in or swollen with water or a solvent and then mixed with the inorganic pigment. The apparatus used in such a process may be a kneader, a banbury mixer, a single-screw extruder, a multi-screw extruder, a two-roll mill, a three-roll mill, a continuous kneader, a continuous two roll mill, or the like. When such a process is performed, the inorganic pigment may be hydrophobized so as to be uniformly dispersed in particles. Aggregates of the inorganic pigment, which may be present before melt kneading, may be crushed. This is effective in uniformly dispersing the inorganic pigment in particles.

After kneading, the kneaded mixture is appropriately pelletized, and the pellets are pulverized by a known process to yield the first powder. For the pulverization of the pellets, a pulverizing machine, such as a hammer mill, a pin mill, a cutter mill, a pulverizer, a turbo mill, a disk mill, a screen mill, or a jet mill, may be used. Two or more of these pulverizing machines may be combined as needed. The pulverization may be performed step by step in such a manner that, for example, the pellets are first roughly crushed into particles of about 1 mm in diameter and further pulverized into smaller particles having a desired particle size. In this instance, any of the above-cited devices may be appropriately used in each step. Freeze pulverization may be applied for highly efficient pulverization. The first powder thus prepared may include particles having varying sizes. Such particles may be sorted by using a classifier so that the first powder can have a desired particle size.

Fluorescent Brightening Agent

The first powder may contain a fluorescent brightening agent. The fluorescent brightening agent in the first powder helps increase the whiteness of the resulting sheet. The fluorescent brightening agent in the first powder helps increase the visual whiteness of the sheet to be formed. The fluorescent brightening agent may be, but is not limited to, a compound based on stilbene, coumarin, oxazole, or naphthalimide.

When the fluorescent brightening agent is added, the fluorescent brightening agent content in the first powder may be 0.01% by mass to 3.0% by mass, for example, 0.1% by mass to 2% by mass, relative to the total mass of the first powder. The upper limit of the fluorescent brightening agent content may be 1.0% by mass or less.

Blue Tinting Dye

The first powder may contain a blue tinting dye. The blue tinting dye in the first powder acts as a complementary color to reduce the yellowness of the resulting sheet, thus increasing the whiteness that people perceive visually. The blue tinting dye may be, but is not limited to, an acid dye, a reactive dye, or a direct dye.

Aggregation Inhibitor

The first powder may contain an aggregation inhibitor. The aggregation inhibitor in the first powder makes the particles in the first powder difficult to aggregate. Although any aggregation inhibitor may be used, a type that can be distributed and present on the surfaces of the particles is beneficial because the first powder is used in an environment where water is not or hardly used.

Inorganic fine particles may be used as such an aggregation inhibitor. Inorganic fine particles distributed on the surfaces of the particles or the like of the first powder inhibit the aggregation of the particles effectively.

The term "aggregation" refers to a state where fragments of a substance or different substances are in physical contact with each other by static electricity or Van der Waals force. When a mass of a plurality of pieces, for example, a powder, does not form an aggregate, all the pieces of the mass are not necessarily separate from each other. In other words, even if a mass of pieces is in a non-aggregated state, some of the pieces may form aggregates. When such aggregates account for 10.0% by mass or less, for example, about 5.0% by mass or less, of all the pieces, the mass of pieces is considered to be not aggregated. Also, when a powder in a container is in the state where the particles of the powder are in contact with each other but are easily separated by softly stirring, air-flow dispersion, free fall, or any other external force that does not break the particles, the powder is considered to be not aggregated.

Examples of the aggregation inhibitor include silica, titanium oxide, aluminum oxide, zinc oxide, cerium oxide, magnesium oxide, zirconium oxide, strontium titanate, barium titanate, and calcium carbonate.

The average particle size of the aggregation inhibitor may be, but is not limited to, 0.001 μm to 1.0 μm, for example, 0.008 μm to 0.6 μm. The particles of the aggregation inhibitor may be dispersed in a state of primary particles, or the primary particles are bound to form higher-order particles. When the primary particles of the aggregation inhibitor have a particle size in the foregoing range, the particles can coat the surfaces of the particles in the first powder, satisfactorily functioning to inhibit aggregation.

The content of aggregation inhibitor in the first powder, if added, may be 0.1 part by mass to 5.0 parts by mass relative to 100.0 parts by mass of the first powder. The aggregation inhibitor with such a content can act effectively as intended. In addition, from the viewpoint of enhancing the effect as the aggregation inhibitor and keeping the aggregation inhibitor from being removed from the resulting sheet, the aggregation inhibitor content may be 0.2 part by mass to 4.0 parts by mass, or 0.5 part by mass to 3.0 parts by mass, relative to 100.0 parts by mass of the first powder.

The coating of the surfaces of the particles in the first powder with the aggregation inhibitor or the distribution of aggregation inhibitor onto the first powder surfaces may be performed by, but is not limited to, mixing the aggregation inhibitor with the resin by the above-described melt-kneading or the like. However, melt-kneading may cause many of the particles of the aggregation inhibitor to enter the particles of the first powder, reducing the effect of the aggregation inhibitor relative to the amount added to the first powder.

It is beneficial to distribute the aggregation inhibitor onto the surfaces of the particles of the first powder as much as possible in view of the mechanism for inhibiting aggregation. The aggregation inhibitor distributed on the surfaces of the powder particles or the like does not necessarily coat or cover the entire surfaces of the powder particles or the like. The percentage of coverage or coating may exceed 100%.

The aggregation inhibitor may be distributed onto the surfaces of the particles or the like by any method, and the first powder and the aggregation inhibitor may be simply mixed with each other, thus allowing the aggregation inhibitor to be attached to the surfaces of the powder particles by static electricity or Van der Waals force. Even the aggregation inhibitor in such a state can produce the intended effect. It may be, however, more effective to uniformly mix the powder particles and the aggregation inhibitor in, for example, a high-speed rotation mixer. This operation may be performed by using a known apparatus, such as an FM mixer, a Henschel mixer, or a super mixer.

Thus, the aggregation inhibitor can be distributed onto the surfaces of the particles and the like of the first powder. The aggregation inhibitor particles thus distributed on the surfaces of the powder particles may be in a state where the particles are partially or fully stuck into the surfaces of the powder particles or the like. The aggregation inhibitor in such a state is unlikely to be removed from the powder particles, thus stably producing the effect of the aggregation inhibitor as intended. The technique using a mixer facilitates the above-described distribution in a system not containing or hardly containing water. Also, even if some of the aggregation inhibitor particles are not stuck into the first powder particles, the aggregation inhibitor can satisfactorily produce the intended effect.

Since the aggregation inhibitor mixed into the first powder makes the first powder unlikely to form aggregates, the first powder can be more easily mixed with fibers in, for example, the mixing section of a sheet forming apparatus. In other words, the first powder containing the aggregation inhibitor can be readily diffused, thus forming a very uniform mixture. In addition, the first powder containing the aggregation inhibitor may be stable to aggregation when stored in a container or the like.

One of the reasons why the presence of the aggregation inhibitor allows the first powder to be favorably mixed with fibers by stirring using air flow or a mixer is that the first powder particles or the like coated with the aggregation inhibitor particles tend to be electrostatically charged. The aggregation of the first powder is suppressed by such static electricity.

Accordingly, it is assumed that once the first powder containing an aggregation inhibitor is attached to fibers, the first powder becomes unlikely to separate from the fibers. Probably, the fibers and the first powder thus can be readily mixed by using a mixer or a stirrer without using other techniques. The first powder mixed with the fibers is stably attached to the fibers and is unlikely to separate from the fibers.

1.1.2. Average Charge on First Powder

The average amount of charge on the first powder may be, but is not limited to, $-70.0\ \mu C/g$ to $-10.0\ \mu C/g$, for example, $-60.0\ \mu C/g$ to $-20.0\ \mu C/g$ or $-50.0\ \mu C/g$ to $-30.0\ \mu C/g$. The higher the average amount of charge on the first powder, the more firmly the first powder attaches to the fibers.

The average amount of charge on the first powder may be measured by triboelectrically charging the first powder. For example, a powder called standard carrier and the first powder are stirred (mixed) in a gas atmosphere, and the amount of charge on the first powder is measured. The standard carrier may be, for example, a spherical carrier of surface-treated ferrite cores available from the Imaging Society of Japan (available as a standard carrier P-01 or N-01 for toners having a positively chargeable or a negatively chargeable polarity) or a ferrite carrier available from Powdertech Co., Ltd.

More specifically, the average amount of charge on the first powder may be measured, for example, as described below. A mixture of 80.0% by mass of the above-described carrier and 20.0% by mass of the first powder is placed in an acrylic container and is agitated by rotating the container on a ball mill stand at 100 rpm for 60 s. The sufficiently agitated mixture of the first powder and the carrier is subjected to measurement of the average amount of charge ($\mu C/g$) with a charge measuring apparatus, for example, a potable suction-type analyzer Model 210HS-2 (manufactured by Trek).

The average amount of charge on the first powder can be controlled by appropriately selecting the constituents of the first powder and the proportions thereof and by adding an adjusting agent and controlling the amount of the adjusting agent. The adjusting agent may be a surfactant or inorganic fine particles.

Examples of the surfactant include glycerin fatty acid ester monoglyceride, acetylated monoglyceride, organic acid monoglyceride, medium-chain fatty acid triglyceride, polyglycerin fatty acid ester, diglycerin fatty acid ester, surfactant fatty acid ester, propylene glycol fatty acid ester, and higher alcohol fatty acid ester. The surfactant may be a nonionic surfactant, an anionic surfactant, a cationic surfactant, or an amphoteric surfactant or a combination thereof. The surfactant may be kneaded with the resin particles in the first powder, or the resin particles may be coated with the surfactant. The charge on the resin particles is varied depending on what surfactant is used.

Examples of the material of the inorganic fine particles include silica (silicon oxide), titanium oxide, aluminum oxide, zinc oxide, cerium oxide, magnesium oxide, zirconium oxide, strontium titanate, barium titanate, and calcium carbonate. The inorganic fine particles may be distributed onto the surfaces of the resin particles, and such inorganic fine particles may be constituted of a single substance or a plurality of substances. The inorganic fine particles may be kneaded with the resin particles in the first powder, or the resin particles may be coated with the inorganic fine particles. The inorganic fine particles often increase the amount of charge on the first powder.

1.2. Second Powder

The sheet forming binder according to the embodiment disclosed herein includes a second powder. The second powder has a function to bind fibers in each other in the sheet to be formed. The second powder may also have a function to color the sheet to be formed. In the sheet forming binder of the present embodiment, the first powder acts mainly to color the sheet, while the second powder acts mainly to bind the fibers to each other in the sheet. The first powder and the second powder each may have other functions.

The volume average particle size of the second powder is larger than that of the first powder. The volume average particle size of the second powder may be 5.0 μm or more and is, for example, 8.0 μm or more, 10.0 μm or more, or 15.0 μm or more. The second powder is selected or controlled so as to have a larger volume average particle size than the first powder. The volume average particle size of the second powder may be measured in the same manner as that of the first powder.

1.2.1. Constituents of Second Powder

The second powder may contain a resin, an inorganic pigment, an aggregation inhibitor, and a fluorescent brightening agent. In some embodiments, the second powder may contain one or both of a resin and a pigment. The second powder may contain no pigment (inorganic pigment).

Resin

The second powder may contain a resin. The resin may have a function to bind the fibers to each other in the sheet or a function as a carrier of an inorganic pigment when the second powder contains an inorganic pigment. The resin may be a natural resin or a synthetic resin and may be a thermoplastic resin or a thermosetting resin. In some embodiments, a thermoplastic resin may be beneficially used. From the viewpoint of enhancing the water resistance of the sheet, the resin contained in the second powder may be a water-insoluble resin. Examples of the resin are the same as cited as the resin in the first powder, and thus description thereof is omitted.

The resin contained in the second powder may melt or soften at 200.0° C. or less. In some embodiments, a resin that melts or softens at 160.0° C. or less may be used in view of energy saving.

While it is beneficial for the resin used in the second powder to have a high glass transition temperature (Tg) in view of resistance to high temperature, a resin having a glass transition temperature appropriate in terms of energy saving and other conditions in manufacture may be selected. The glass transition temperature of the resin in the second powder may be appropriately selected according to the thickness of the sheet to be formed or the temperature of heat treatment. The glass transition temperature of the resin used in the second powder may be 45.0° C. or more or 50.0° C. or more. Also, the upper limit of the glass transition temperature may be 95.0° C. or less or 90.0° C. or less.

The second powder may be prepared by mixing and kneading the constituents with, for example, a kneader, a banbury mixer, a single-screw extruder, a multi-screw extruder, a two roll mill, a three roll mill, a continuous kneader, a continuous two roll mill, or the like, followed by appropriately pelletizing the mixture and pulverizing the pellets. The second powder may include particles of varying particle sizes. Such particles may be sorted by using a known classifier. The shape of the particles in the second powder may be, but is not limited to, spherical, disciform, fibrous, or indefinite.

Inorganic Pigment

The second powder may contain an inorganic pigment. The inorganic pigment in the second powder colors the sheet. The color and the material of the inorganic pigment are not particularly limited and are the same as described for the first powder. When the first powder and the second powder each contain an inorganic pigment, the inorganic pigments may be the same or different between the powders. Use of the same inorganic pigment in both powders reduces the nonuniformity in color of the sheet caused by the inorganic pigment.

When a white inorganic pigment is used, a powder constituted of pigment particles mainly containing titanium oxide may be used. Titanium oxide has a high refractive index and, accordingly, helps increase the whiteness of the resulting sheet even if the content thereof is low. When titanium oxide is used, titanium dioxide is beneficial. In this instance, the titanium dioxide content in the second powder may be 8.0% by mass or less, for example, 7.0% by mass or less or 6.0% by mass or less. The lower limit of the titanium dioxide content may be, but is not limited to, 0.01% by mass or more or 0.1% by mass or more.

The second powder may contain no inorganic pigment. The second powder not containing an inorganic pigment can have an increased resin content, accordingly increasing a function to bind the fibers to each other in the sheet. In this instance, the second powder functions mainly as a binding agent in the sheet forming binder to bind fibers to each other.

The inorganic pigment in the second powder may have a function to control the color tone of the resulting sheet. For example, use of such an inorganic pigment enables color sheets varying in color tone to be easily formed in a dry process. Use of a white inorganic pigment enables a more highly white sheet to be formed.

The inorganic pigment in the second powder may be integrated with the resin as with the inorganic pigment in the first powder. In such a state, the inorganic pigment may be contained in the resin particles or attached to the resin particles or may be in both states at one time. The shape of the particles may be, but is not limited to, spherical, disciform, fibrous, or indefinite. In some embodiments, the shape of the particles may be as spherical as possible. Such particles are likely to be distributed among fibers.

For allowing the resin and the inorganic pigment to be present integrally in the second powder, a known process may be used as described for the first powder.

Fluorescent Brightening Agent

The second powder may contain a fluorescent brightening agent. The fluorescent brightening agent in the second powder helps increase the whiteness of the resulting sheet. The fluorescent brightening agent in the second powder helps increase the visual whiteness of the sheet to be formed. The fluorescent brightening agent may be, but is not limited to, a compound based on stilbene, coumarin, oxazole, or naphthalimide.

When the fluorescent brightening agent is added, the fluorescent brightening agent content in the second powder may be 0.01% by mass to 3.0% by mass, for example, 0.1% by mass to 2% by mass, relative to the total mass of the second powder. The upper limit of the fluorescent brightening agent content may be 1.0% by mass or less.

Blue Tinting Dye

The second powder may contain a blue tinting dye. The blue tinting dye in the second powder acts as a complementary color to reduce the yellowness of the resulting sheet, thus increasing the whiteness that people perceive visually. The blue tinting dye may be, but is not limited to, an acid dye, a reactive dye, or a direct dye.

Aggregation Inhibitor

The second powder may contain an aggregation inhibitor. The aggregation inhibitor in the second powder makes the particles in the second powder difficult to aggregate. Although any aggregation inhibitor may be used, a type that can be distributed and present on the surfaces of the particles is beneficial because the second powder is used in an environment where water is not or hardly used.

The substance, the particle size, the proportion to other constituents, and the content of the aggregation inhibitor and how to coat the particles with the aggregation inhibitor are the same as those described for the first powder.

Since the aggregation inhibitor mixed into the second powder makes the second powder unlikely to form aggregates, the first powder can be more easily mixed with fibers in, for example, the mixing section of a sheet forming apparatus. In other words, the second powder containing the aggregation inhibitor can be readily diffused, thus forming a very uniform mixture. In addition, the second powder containing the aggregation inhibitor may be stable to aggregation when stored in a container or the like.

1.2.2. Average Charge on Second Powder

The average amount of charge on the second powder may be, but is not limited to, −70.0 ρC/g to −10.0 μC/g, for example, −60.0 μC/g to −20.0 ρC/g or −50.0 μC/g to −30.0 μC/g. The higher the average amount of charge on the second powder, the more firmly the second powder attaches to the fibers.

1.3. Contents, Compositions, Properties, Etc. of First and Second Powders

In the sheet forming binder of the embodiment disclosed herein, the volume average particle size d1 of the first powder is smaller than the volume average particle size d2 of the second powder. Hence, d1<d2 holds true. Since the volume average particle size of the first powder is smaller than that of the second powder, the surface area per mass of the first powder is larger than that of the second powder. Accordingly, the first powder is more likely than the second powder to scatter light. When the first powder contains a white inorganic pigment, the white pigment is expected to help scatter light.

Also, the proportion of the first powder is 10.0% by mass or more relative to the total mass of the sheet forming binder. By combining the second powder with 10.0% by mass or more of the first powder, the surface area per mass of the sheet forming binder increases as a whole. Thus, the sheet forming binder can scatter light as a whole, thus coloring the sheet white effectively.

When the first powder and the second powder contain a white inorganic pigment, the inorganic pigment content in the first powder is higher than that in the second powder. The inorganic pigment may be contained in the first powder but not in the second powder. When the first powder contains a white inorganic pigment with a high content, the white pigment efficiently covers the surfaces of the fibers and enhances the effect to scatter light, thus increasing the whiteness of the resulting sheet.

When the second powder contains little or no white inorganic pigment, the percentage of the binder component (resin or the like) in the second powder can be increased to increase the strength of the resulting sheet.

When the first powder and/or the second powder contain a fluorescent brightening agent and/or a blue tinting dye for imparting a blue tint, the whiteness of the sheet can be further increased. The blue tinting dye acts as a complementary color to reduce the yellowness of the resulting sheet, thus increasing the whiteness that people perceive visually.

In the sheet forming binder includes a first powder having a volume average particle size of 5.0 μm or less and a second powder having a volume average particle size of 10.0 μm or more, the first powder can act more efficiently to increase the whiteness of the resulting sheet. Also, the second powder can act more efficiently to bind fibers to each other.

Furthermore, by controlling the average amount of charge on the first powder in the range of −50.0 μC/g to −30.0 μC/g, the first powder is more efficiently attached to the fibers. A charge in such a range can be applied by mixing the first powder with the fibers by agitation or stirring.

The first powder containing titanium dioxide as the white inorganic pigment increases the difference in refractive index between the fibers and the resin, efficiently scattering light. When the titanium dioxide content in the first powder is 30.0% by mass or more, light is sufficiently scattered.

When 8.0% by mass or less of titanium dioxide is contained as the white inorganic pigment, the percentage of the binder component (resin or the like) acting to bind fibers to each other in the second powder can be increased to impart a satisfactory strength to the sheet.

When one or both of the first powder and the second powder contain titanium dioxide, the particle size of the titanium dioxide may be 200.0 nm to 300.0 nm, for example, 200.0 nm to 270.0 nm. Titanium dioxide having a particle size in such a range can efficiently reflect light, increasing the whiteness of the resulting sheet.

The fluorescent brightening agent in the first powder and/or the second powder increases the whiteness of the sheet. However, when the content thereof exceeds 1.0% by mass, the sheet may be tinted with the color of the fluorescent brightening agent. When a fluorescent brightening agent is added to the first powder, the content thereof is beneficially 1.0% by mass or less. Even though the fluorescent brightening agent is 1.0% by mass or less, the whiteness of the resulting sheet can be sufficiently increased.

The sheet forming binder of the embodiment disclosed herein includes the first powder and the second powder, and the powders may be in the form of a mixture or may be independent of each other so as to be mixed before use.

1.4. Use of Sheet Forming Binder

The sheet forming binder of the embodiment disclosed herein is mixed with fibers before use. Examples of the fibers include natural fibers, such as animal fibers and plant fibers, chemical fibers, such as organic fibers, inorganic fibers, and organic-inorganic composite fibers. More specifically, examples of the material of the fibers include cellulose, silk, wool, cotton, hemp, kenaf, flax, ramie, jute, manila hemp, henequen, conifers, and broadleaf trees. Such materials may be used singly or in combination, and the fibers may be purified recycled fibers. The fibers may be dried or may be impregnated with water or other liquid, such as an organic solvent. The fibers may be surface-treated.

One of the fibers contained in the sheet formed by using the sheet forming binder according to an embodiment of the present disclosure, when it is considered to be independent of the other fibers, has a diameter of 1.0 μm to 1000.0 μm on average. For fibers having a noncircular diameter, the diameter is the largest of the lengths in the longitudinal direction or the equivalent circular diameter that is the diameter of a circle having an area equivalent to the cross section of the fiber.

The average diameter of the fibers may be measured by using a fiber dimension distribution analyzer based on, for example, image analysis. The fiber dimension distribution analyzer may be a Fiber Tester manufactured by Lorentzen & Wettre.

The length of the fibers in the sheet, as the length of an independent single fiber, may be, but is not limited to, 1.0 μm to 5.0 mm in the longitudinal direction. The average length of the fibers in terms of length-weighted mean length is 20.0 μm to 3600.0 μm. The length of the fibers may have a dispersion (distribution).

The fibers mentioned herein refer to fibers independent of each other or a mass of fibers like cotton. The fibers may be in a defibrated form that is produced by defibrating a material into fibrous components. Examples of the material to be defibrated include pulp sheets, paper, used paper, tissue paper, kitchen paper, cleaning cloth, filters, liquid absorbers, sound absorbers, cushioning material, mats, cardboard, and other materials in which fibers are entangled with or bound to each other. The material to be defibrated may be a sheet formed as disclosed herein, and the sheet may be new or used. The material to be defibrated may contain fibers (organic fibers, inorganic fibers, or organic/inorganic composite fibers) made of rayon, lyocell, cuprammonium rayon, vinylon, an acrylic compound, nylon, aramid, polyester, polyethylene, polypropylene, polyurethane, polyimide, carbon, glass, or a metal.

The sheet forming binder of the embodiment disclosed herein will be mixed with fibers before use and is thus one of the raw materials of the sheet. As described above, the sheet forming binder includes the first powder functioning mainly to color the sheet, and the second powder functioning mainly to bind the fibers to each other in the sheet. The material of the fibers used with the sheet forming binder and the constituents of the first and the second powder may be selected so that the value d1/D of the volume average particle size d1 of the first powder relative to the average diameter D of the fibers can be less than 0.350 and that the value d2/D of the volume average particle size d2 of the second powder relative to the average diameter D of the fibers can be 0.350 to 1.000. In such conditions, the first powder can efficiently cover the surfaces of the fibers to hide the coloring material that may be contained in the fibers, and, in addition, the second powder can impart a strength sufficient for use to the resulting sheet. In some embodiments, the average diameter of the fibers may be about 7.0 µm to 50.0 µm.

In addition, the first powder and the second powder may satisfy d1/d2>0.100. In a combination of such powders, the first powder is less likely to attach to the second powder. Thus, the first powder becomes likely to efficiently attach to the fibers.

2. POWDER SET

The powder set according to an embodiment of the present disclosure is mixed with fibers before use and includes the above-described first and second powders. Hence, the powder set includes the first powder functioning mainly to color the sheet, and the second powder functioning mainly to bind the fibers to each other in the sheet. Also, the value d1/D of the volume average particle size d1 of the first powder relative to the average diameter D of the fibers is less than 0.350, and the value d2/D of the volume average particle size d2 of the second powder relative to the average diameter D of the fibers is 0.350 to 1.000.

3. CONTAINER

Figure 1:
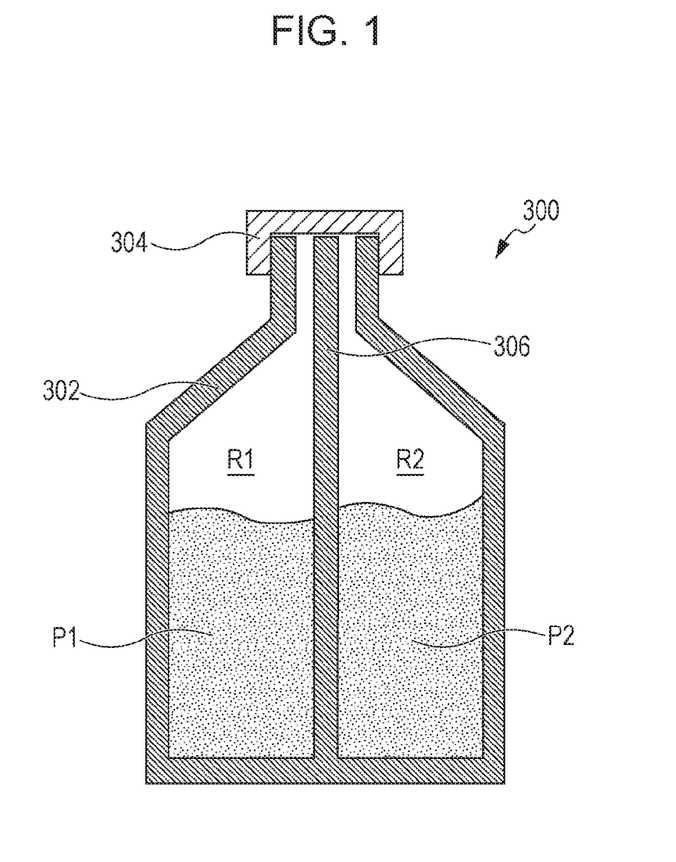
FIG. 1 is a schematic diagram of a container according to an embodiment of the present disclosure.

The container according to an embodiment of the present disclosure accommodates the sheet forming binder. FIG. 1 is a schematic diagram of a container according to an embodiment of the present disclosure. The container 300 of the embodiment shown in FIG. 1 contains the sheet forming binder and includes a container body 302 and a container lid 304. The container body 302 has a first accommodation chamber R1 to accommodate the first powder P1 and a second accommodation chamber R2 to accommodate the second powder P2.

The container body 302 has the first accommodation chamber R1 and the second accommodation chamber R2 therein. The first accommodation chamber R1 and the second accommodation chamber R2 are separated by a partition wall 306 that is integrated with the container body 302 in the embodiment shown in FIG. 1. In other words, the first accommodation chamber R1 and the second accommodation chamber R2 are each defined by the wall of the container body 302 and the partition wall 306.

The container 300 can be a cartridge for the sheet forming binder and may be used to transport or store the sheet forming binder. The container 300 of the disclosed embodiment contains the first powder P1 and the second powder P2 in the respective separate accommodation chambers thereof. Thus, the sheet forming binder can be stored (allowed to stand still) for a longer period than in the case where the first powder P1 and the second powder P2 are stored together in a single chamber.

For example, in an embodiment, the first powder P1 may contain an inorganic pigment, while the second powder P2 does not contain any inorganic pigment or contains an inorganic pigment with a lower content than in the first powder P1, and thus the specific gravity of the first powder P1 and the specific gravity of the second powder P2 may vary therebetween. In such an embodiment, when the first powder P1 and the second powder P2 are stored together in the form of a mixture in a single accommodation chamber, the powder having a large specific gravity is likely to migrate to the lower side of the accommodation chamber (in the direction of gravity) as time passes. When a container having a single accommodation chamber and configured to take the sheet forming binder out of the lower side thereof is used as a cartridge in a sheet forming apparatus, the powder having a larger specific gravity tends to be supplied in a higher proportion than the other powder to the sheet forming apparatus. This tendency becomes obvious when the sheet forming binder is stored for a long period.

In contrast, the container 300 of the embodiment disclosed herein accommodates the first powder P1 and the second powder P2 in the respective separate accommodation chambers, and, therefore, the sheet forming binder is unlikely to be affected by gravity while being stored. When this container is used as a cartridge of a sheet forming apparatus, the powders of the sheet forming binder can be easily supplied with a predetermined proportion. Such an advantageous effect is clearly produced when the sheet forming binder is stored for a long period. The long period used herein may be a period of 1 day or more, for example, a period of 10 days or more.

Figure 2:
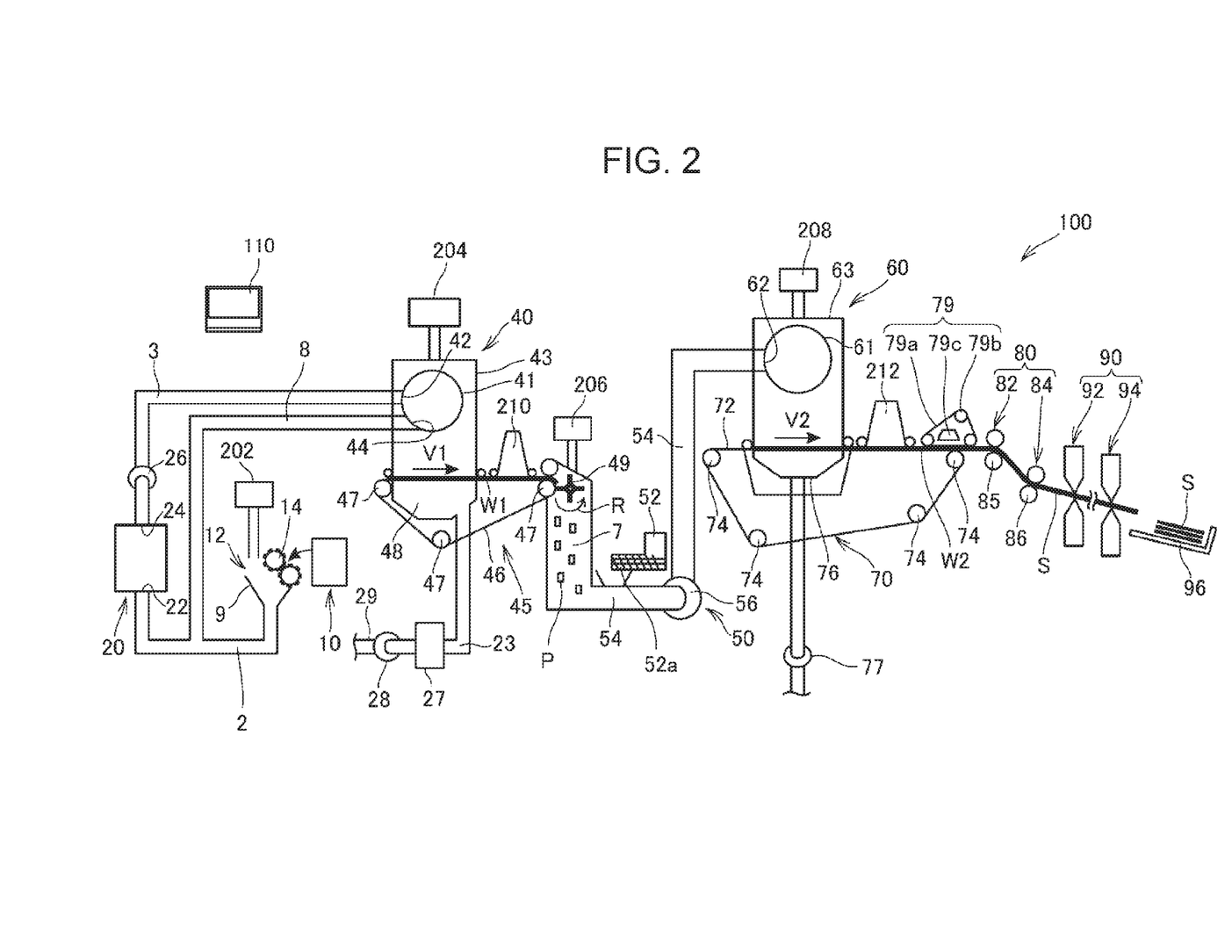
FIG. 2 is a schematic diagram of a sheet forming apparatus according to an embodiment of the present disclosure.

The sheet forming binder of the embodiment disclosed herein may be supplied to a mixing section 50 of a sheet forming apparatus described later herein by using a feeder or a valve of the sheet forming apparatus 100. The sheet forming binder is fed or supplied in the form of powder. Accordingly, the sheet forming apparatus may be configured to receive the sheet forming binder in the mixing section 50, for example, through a tube or the like immediately after the sheet forming binder has been prepared. However, the sheet forming binder may be distributed as a product through a commercial channel, depending on the location of the apparatus. In this instance, the sheet forming binder may be transported or stored after being prepared. Use of the container 300 of the embodiment disclosed herein makes it easy to store or transport the sheet forming binder.

The configuration of the container 300 is not particularly limited but, in an embodiment, may be in the form of a cartridge adapted for the sheet forming apparatus 100. The container 300 may be made of, for example, a polymer. The container 300 may be a rigid and strong box or a flexible film bag. The container shown in FIG. 1 is a bottle, and the material thereof is not particularly limited. Although the container 300 of the embodiment shown in the figure has the container lid 304, the container lid 304 is optional, provided that the container 300 has the first accommodation chamber R1 and the second accommodation chamber R2.

The first accommodation chamber R1 and the second accommodation chamber R2 in which the sheet forming binder is accommodated may be open or closed, provided that they can accommodate and hold the powders of the sheet forming binder. The first accommodation chamber R1 and the second accommodation chamber R2 may be formed of a film, a molded material, or the like. When the first accommodation chamber R1 and the second accommodation chamber R2 are formed of a film, the container 300 may further include a molded housing enclosing the film. Alternatively, the first accommodation chamber R1 and the second accommodation chamber R2 may be formed of a molded material.

The film or molded material forming the first accommodation chamber R1 and the second accommodation chamber R2 may be made of a polymer, a deposited metal, or the like and may include a plurality of layers. When the container 300 includes a plurality of members made of a film or a molded material, the members may be welded or bonded. When the sheet forming binder in the container is likely to be changed or affected by contact with air, the film or the molded material may be made of a material having a low gas permeability, and the container lid 304 may have an airtight mechanism. Beneficially, the portion of the film or molded material of the first accommodation chamber R1 and the second accommodation chamber R2 that will come into contact with the sheet forming binder is stable to the sheet forming binder.

The capacity of the first accommodation chamber R1 and the second accommodation chamber R2 is not particularly limited. In an embodiment, the content of the first powder P1 in the mixture of the first and the second powder before use as the sheet forming binder may be 10.0% by mass or more. The capacities of the first accommodation chamber R1 and the second accommodation chamber R2 may be varied according to the proportions of the first powder P1 and the second powder P2. The first accommodation chamber R1 and the second accommodation chamber R2 may contain an inert solid or gas together with the respective powders. The volume of the powders to be accommodated in the first accommodation chamber R1 and the second accommodation chamber R2 is not particularly limited.

The first accommodation chamber R1 and the second accommodation chamber R2 may have channels communicating with the outside of the container 300, and the sheet forming binder is removed through the channels. Alternatively, the channels of the first accommodation chamber R1 and the second accommodation chamber R2 have other channels as well as the channels communicating with the outside. Such a channel may include a valve. The valves of the first accommodation chamber R1 and the second accommodation chamber R2 may be located at any position but may be located such that the valves can be on the side opposite to the direction of gravity when the container is in a normal position during transfer, transport, or use. The valves located at such a position can easily release pressure generated in the first accommodation chamber R1 or the second accommodation chamber R2 without discharging the sheet forming binder.

4. SHEET FORMING APPARATUS

The sheet forming apparatus according to an embodiment of the present disclosure includes a mixing section configured to mix the fibers with the sheet forming binder to prepare a mixture, a sheet forming section configured to deposit the mixture and form the deposited mixture into a sheet by heating the mixture. FIG. 2 is a schematic diagram of a sheet forming apparatus 100 according to an embodiment of the present disclosure.

The sheet forming apparatus 100 is adapted to form a paper sheet by using used paper, such as confidential document paper, as the starting material, wherein the used paper is dried and defibrated into fibers, and the fibers are pressed, heated, and cut to yield new paper sheets. Additives may be added into the defibrated material to increase or improve the binding strength, the whiteness, or the like of the sheet or impart a color, a smell, flame retardance, or any other function to the sheet, depending on the application. Also, by controlling the density, the thickness, the shape of the sheet to be formed, various types of paper sheet, such as A4 or A3 office paper and business card paper, can be formed according to the application.

The sheet forming apparatus 100 of the embodiment disclosed herein includes a feeding section 10, a crushing section 12, a defibrating section 20, a screening section 40, a first web forming section 45, a rotation member 49, a mixing section 50, a depositing section 60, a second web forming section 70, a transport unit 79, a sheet forming section 80, a cutting section 90, and a control section 110.

The sheet forming apparatus 100 also includes humidifiers 202, 204, 206, 208, 210, and 212 operable to humidify the material and/or the space in which the material is transferred. The operating principle of the humidifiers 202, 204, 206, 208, 210, and 212 is not particularly limited, and the humidifiers may be of a steam generation type, an evaporation type, a warm-air evaporation type, an ultrasonic type, or the like.

In the embodiment disclosed herein, the humidifiers 202, 204, 206, and 208 are of an evaporation type or a warm-air evaporation type. More specifically, the humidifiers 202, 204, 206, and 208 have a filter (not shown) to be soaked with water. The humidifiers supply air humidified by passing air through the filters soaked with water. The humidifiers 202, 204, 206, and 208 may further include a heater (not shown) operable to efficiently increase the humidity of the humidified air.

In the embodiment disclosed herein, the humidifiers 210 and 212 are of an ultrasonic type. More specifically, the humidifiers 210 and 212 include a vibrator (not shown) configured to atomize water. These humidifiers supply a mist generated from the vibrator.

The feeding section 10 feeds the starting material to the crushing section 12. The starting material used in the sheet forming apparatus 100 contains fibers, and examples of the starting material include paper, pulp, pulp sheets, woven or non-woven fabrics. In the embodiment disclosed herein, the sheet forming apparatus 100 uses used paper as the starting material. The feeding section 10 may include, for example, a stacker operable to stack used paper sheets, and an automatic feeder operable to feed the used paper sheets to the crushing section 12 from the stacker.

The crushing section 12 cuts (roughly crushes) the starting material fed from the feeding section 10 into small pieces with a crushing blade 14. The crushing blade 14 cuts the starting material in the atmosphere (in air). The crushing section 12 may include, for example, a pair of crushing blades 14 operable to pinch the starting material therebetween, and a driver operable to drive the crushing blades 14; hence the crushing section 12 may have a structure similar to what is called a shredder. The crushed pieces of the starting material may have any shape and dimensions, provided that they are suitable for defibration in the defibrating section 20. The crushing section 12 cuts the starting material into pieces of, for example, one to several centimeters or less on each side.

The crushing section 12 includes a chute (hopper) 9 to receive the roughly crushed pieces cut by the crushing blades 14. The chute 9 may be in the form of, for example, a hopper that tapers in such a manner that the width thereof decreases gradually in the direction in which the crushed pieces flow (move). Thus, the chute 9 can receive many of the crushed pieces. The chute 9 is coupled with a tube 2 communicating with the defibrating section 20. The tube 2 defines a path through which the crushed material (crushed pieces) cut by the crushing blades 14 is transferred to the defibrating section 20. The crushed pieces are collected in the chute 9 and transferred (transported) to the defibrating section 20 through the tube 2. The crushed pieces may be transferred to the defibrating section 20 through the tube 2 by, for example, an air flow generated by a blower (not shown).

Humidified air is fed to the chute 9 and the vicinity thereof in the crushing section 12 from the humidifier 202. The humidified air reduces static electricity that causes the crushed pieces cut by the crushing blades 14 to be adsorbed to the chute 9 or the inner surface of the tube 2. Also, since the crushed pieces cut by the crushing blades 14 are transferred together with the humidified (high-humidity) air to the defibrating section 20, it is expected that sticking of the defibration product onto the inner surface of the defibrating section 20 will be suppressed. The humidifier 202 may be configured to feed humidified air to the crushing blades 14 to remove static electricity from the material fed from the feeding section 10. For removing static electricity, an ionizer may be used together with the humidifier 202.

The defibrating section 20 defibrates the crushed pieces cut in the crushing section 12. More specifically, the defibrating section 20 defibrates the crushed material (crushed pieces) cut in the crushing section 12 into defibration pieces (defibration product). The term "defibrate" used herein implies that a material (material to be defibrated) in which a plurality of fibers are bound to each other is broken into discrete fibers that are separate from one another. The defibrating section 20 can also separate the resin particles, ink, toner, bleeding inhibitor, and other substances attached to the starting material from the fibers.

The material that has passed through the defibrating section 20 is called a defibration product. The defibration product may contain resin particles (binder resin to bind the fibers to each other) removed from the fibers by defibration, a coloring material such as ink or toner, a bleeding inhibitor, a paper enforcing agent, and other additives, as well as the defibrated discrete fibers. The fibers in the defibration product may be in the form of strings or ribbons. The fibers in the defibrated product may be independent of one another without being entangled or may be in the form of an aggregate formed with fibers entangled with each other.

The defibrating section 20 defibrates the material in a dry process. The dry process mentioned herein implies that the defibration or other operation is performed not in a liquid, but in a gas atmosphere, such as in the atmospheric air (in air). In the embodiment disclosed herein, an impeller mill is used as the defibrating section 20. More specifically, the defibrating section 20 includes a high-speed rotor (not shown) and a liner (not shown) disposed at the periphery of the rotor. The crushed pieces cut in the crushing section 12 are defibrated in a state pinched between the rotor and the liner of the defibrating section 20. The defibrating section 20 generates an air flow by the rotation of the rotor. The air flow enables the defibrating section 20 to suck the crushed pieces of the starting material from the tube 2 and transfers the defibration product to an outlet 24. The defibration product is fed to another tube 3 from the outlet 24 and transferred to the screening section 40 through the tube 3.

Thus, the defibration product produced in the defibrating section 20 is transferred to the screening section 40 from the defibrating section 20 by the air flow generated by the defibrating section 20. In addition, in the present embodiment, the sheet forming apparatus 100 includes a defibrating section blower 26 that is an air flow generator. The air flow generated by the defibrating section blower 26 carries the defibration product to the screening section 40. The defibrating section blower 26 is coupled to the tube 3 so as to suck air with the defibration product from the defibrating section 20 to feed the air to the screening section 40.

The screening section 40 includes an inlet 42 through which the defibration product defibrated in the defibrating section 20 and air are introduced from the tube 3. The screening section 40 screens the fibers of the defibration product introduced into the inlet 42 by the length of the fibers. More specifically, the screening section 40 screens the defibration product obtained in the defibrating section 20 so as to classify the defibrated pieces into a first screened portion consisting of defibrated pieces having a predetermined size or less and a second screened portion consisting of defibrated pieces larger than the predetermined size. The defibrated pieces of the first screened portion (hereinafter referred to as first screened defibrated pieces) include fibers or particles, and the defibrated pieces of the second screened portion (hereinafter referred to as second screened defibrated pieces) include, for example, larger fibers, insufficiently defibrated pieces (crushed pieces remaining without being sufficiently defibrated), aggregates of defibrated fibers, or entangled fibers.

In the embodiment disclosed herein, the screening section 40 includes a drum (sieve) 41 and a housing (cover) 43 accommodating the drum 41.

The drum 41 is a hollow cylindrical sieve rotated by a motor. The drum 41 includes a mesh (filter or screen) functioning as a sieve. The mesh enables the drum 41 to screen the defibration product and classify the defibrated pieces into the first screened portion consisting of pieces smaller than the mesh size (openings) of the mesh and the second screened portion consisting of pieces larger than the mesh size. The mesh of the drum 41 may be, for example, a wire net, an expanded metal net produced by expanding a metal plate having cuts, or a punching metal plate that is a metal plate having openings formed with a press machine or the like.

The defibration product introduced into the inlet 42 is fed into the inside of the drum 41 with the air flow, and the first screened defibrated pieces are dropped through the mesh of the drum 41 by the rotation of the drum 41. The second screened defibrated pieces remaining without passing through the mesh of the drum 41 are carried from the inlet 42 to an outlet 44 by the air flow entering the drum 41, thus fed to a tube 8.

The tube 8 links the inside of the drum 41 with the tube 2 The second screened defibrated pieces transferred into the tube 2 through the tube 8 are fed, together with the crushed pieces cut in the crushing section 12, into the inlet 22 of the defibrating section 20 through the tube 2. Thus, the second screened defibrated pieces are returned to the defibrating section 20 and defibrated.

Also, the first screened defibrated pieces screened by the drum 41 pass through the mesh of the drum 41 and disperse into the air, thus falling onto a mesh belt 46 of the first web forming section 45 under the drum 41.

The first web forming section 45 (separating section) includes a mesh belt 46 (separation belt), rollers 47, and a suction member (suction mechanism) 48. The mesh belt 46 is an endless belt and supported by three rollers 47 so as to be moved in the direction indicated by the arrow by the rotation of the rollers 47. The surface of the mesh belt 46 is defined by a mesh having openings with a predetermined size. Very small particles of the first screened defibrated pieces falling from the screening section 40 and having so small a particle size as can pass through the mesh of the mesh belt 46 fall down under the mesh belt 46. The other pieces, that is, the fibers having so large a size as cannot pass through the mesh, are deposited on the mesh belt 46 and transported on the mesh belt 46 in the direction indicated by the arrow. The very small particles falling through the mesh belt 46 include relatively small substances and low-density substances (resin particles, color material, additives, etc.) Such particles are to be removed without being used for forming the sheet S in the sheet forming apparatus 100.

The mesh belt 46 moves at a constant velocity V1 during normal operation for forming the sheet S. The normal operation refers to all operations except the start control and the stop control of the sheet forming apparatus 100. More specifically, the phrase "during normal operation" is the period while the sheet forming apparatus 100 is forming sheets S having desired quality.

Thus, the defibrated pieces of the defibration product obtained in the defibrating section 20 are classified into the first screened portion and the second screened portion in the screening section 40, and the defibrated pieces of the second screened portion are returned to the defibrating section 20. For the first screened portion, unnecessary particles are removed through the first web forming section 45. The rest of the first screened portion after removing the unnecessary particles is suitable as the material for forming the sheet S and is deposited on the mesh belt 46 to form a first web W1.

The suction member 48 sucks air under the mesh belt 46. The suction member 48 is coupled to a dust collector 27 with a tube 23 therebetween. The dust collector 27 is of a type using a filter or a type of cyclone separator and is operable to separate very small particles from the air flow. A collection blower 28 is disposed downstream of the dust collector 27. The collection blower 28 functions as a dust-collecting suction member to suck air from the dust collector 27. The air from the collection blower 28 is discharged from the sheet forming apparatus 100 through a tube 29.

In this structure, the collection blower 28 draws air from the suction member 48 through the dust collector 27. The suction member 48 sucks very small particles passing through the mesh of the mesh belt 46 together with air and transfers the very small particles to the dust collector 27 through the tube 23. The dust collector 27 separates the very small particles that have passed through the mesh belt 46 from the air flow to accumulate the particles.

Thus, the fibers obtained by removing unnecessary particles from the first screened portion are deposited onto the mesh belt 46 to form the first web W1. The sucking of the collection blower 28 facilitates the formation of the first web W1 on the mesh belt 46 and enables easy removal of unnecessary matter.

Humidified air is fed to the space where the drum 41 is present from the humidifier 204. The humidified air humidifies the first screened defibrated pieces within the screening section 40. Thus, static electricity causing the first screened defibrated pieces to attach to the mesh belt 46 is reduced, so that the first screened defibrated pieces become easy to remove from the mesh belt 46. In addition, since static electricity is reduced, the first screened defibrated pieces become unlikely to attach to the rotation member 49 and the inner wall of the housing 43. Furthermore, the suction member 48 can efficiently suck unnecessary particles.

In the sheet forming apparatus 100, the structure operable to screen the defibration product and classify the defibrated pieces into the first screened portion and the second screened portion is not limited to the screening section 40 including the drum 41. In an embodiment, the pieces of the defibration product obtained in the defibrating section 20 may be classified by a classifier. The classifier may be, for example, a cyclone classifier, an elbow jet classifier, or an eddy classifier. Such a classifier can screen the defibration product and classify the defibrated pieces into the first screened portion and the second screened portion, separating the first screened defibrated pieces from the second screened defibrated pieces. Furthermore, such a classifier can be configured to separate and remove unnecessary matter including pieces having a relatively small size or low density (resin particles, coloring material, additives, etc.) in the defibration product from the defibration product. In an embodiment, for example, the classifier may be configured to remove fine particles from the first screened portion. In this instance, the defibrated pieces of the second screened portion may be returned to the defibrating section 20, and unnecessary particles may be collected by the dust collector 27. Thus, the first screened portion except the unnecessary particles is transferred to a tube 54.

The humidifier 210 feeds air containing a mist to the side downstream of the screening section 40 in the moving direction of the mesh belt 46. The mist consisting of very small particles of the water generated from the humidifier 210 falls toward the first web W1 to supply water to the first web W1. Thus, the water content in the first web W1 is controlled to reduce static electricity that causes the fibers and the like to attach to the mesh belt 46.

The sheet forming apparatus 100 includes the rotation member 49 operable to cut the first web W1 deposited on the mesh belt 46. The first web W1 separates from the mesh belt 46 at the position where the mesh belt 46 is turned back by the roller 47, and is cut by the rotation member 49.

The first web W1 is a soft material in the form of a web, and the rotation member 49 disentangles the fibers of the first web W1 to bring the fibers into a state easy to mix with the sheet forming binder in the mixing section 50 described later herein.

The rotation member 49 may have, but is not limited to, a structure including a plate-like blade, thus in the form of a rotary blade. The rotation member 49 is disposed so that the blade thereof can come into contact with the first web W1 separating from the mesh belt 46. The rotation of the rotation member 49 (for example, rotation in the direction indicated by arrow R shown in FIG. 2) causes the blade to hit the first web W1 transferred and separating from the mesh belt 46 to cut the web into fragments P.

Beneficially, the rotation member 49 is disposed at a position where the blade of the rotation member 49 does not hit the mesh belt 46. For example, the distance between the tip of the blade of the rotation member 49 and the mesh belt 46 may be from 0.05 mm to 0.5 mm. Such a distance allows the rotation member 49 to efficiently cut the first web W1 without damaging the mesh belt 46.

The fragments P produced with the rotation member 49 P fall into a tube 7 and carried to the mixing section 50 by an air flow in the tube 7.

Humidified air is fed to the space where the rotation member 49 is present from the humidifier 206, thus reducing static electricity causing fibers to attach to the inner wall of the tube 7 or the blade of the rotation member 49. Also, since high-humidity air is fed to the mixing section 50 through the tube 7, static electricity affecting the mixing section 50 can be reduced.

The mixing section 50 includes an additive feed section 52 operable to feed an additive containing the above-described sheet forming binder, a tube 54 communicating with the tube 7 and in which air and the fragments P flow, and a mixing blower 56.

The fragments P are formed of the fibers obtained by removing unnecessary particles from the first screened defibrated pieces that have passed through the screening section 40. The mixing section 50 adds the additive containing the sheet forming binder to the fibers of the fragments P and mixes them together.

In the mixing section 50, the mixing blower 56 generates air. The air carries the fragments P and the additive while mixing these materials in the tube 54. The fragments P are disentangled into thinner fibers during flowing in the tubes 7 and 54.

The additive feed section 52 (resin feed section), which is coupled to an additive cartridge (not shown) containing the additive, feeds the additive from the additive cartridge to the tube 54. The additive cartridge may be removable from the additive feed section 52. The additive cartridge may include a structure configured to supply the additive thereto. The additive feed section 52 temporarily stores the additive defined by fine powder or very small particles from the additive cartridge. The additive feed section 52 include a discharge portion 52a (additive feed portion) through which the temporarily stored additive is fed to the tube 54. The additive cartridge may be the above-described container 300.

The discharge portion 52a includes a feeder (not shown) operable to feed the additive in the additive feed section 52 to the tube 54, and a shutter (not shown) operable to open and close the tube connecting the feeder and the tube 54. By closing the shutter, the tube, or opening, connecting the discharge portion 52a and the tube 54 is closed, shutting the supply of the additive to the tube 54 from the additive feed section 52.

When the feeder of the discharge portion 52a is not in operation, the additive is not fed to the tube 54 through the discharge portion 52a. However, when a negative pressure is generated in the tube 54, the additive may flow into the tube 54 even though the feeder of the discharge portion 52a is stopped. By closing the discharge portion 52a, such a flow of the additive can be completely shut out.

The additive to be fed by the additive feed section 52 contains the sheet forming binder of an embodiment of the present disclosure functioning to bind fibers to each other. The additive may further contain other substances.

The sheet forming binder in the additive is melted by heating to bind the fibers to each other. Therefore, when the sheet forming binder is mixed with the fibers but the sheet forming binder in the mixture is not heated to the temperature at which the sheet forming binder is melted, the fibers are not bound to each other.

The additive to be fed by the additive feed section 52 may contain a aggregation inhibitor inhibiting the fibers or the sheet forming binder from forming aggregates or a flame retardant making the fibers or the like difficult to burn, in addition to the sheet forming binder functioning to bind the fibers, depending on the type of sheet to be formed.

The fragments P falling in the tube 7 and the additive fed from the additive feed section 52 are drawn into the tube 54 by the air flow generated by the mixing blower 56, thus passing through the mixing blower 56. The fibers of the fragments P and the additive are mixed by the air flow generated by the mixing blower 56 and/or the action of the rotation member, such as the blade of the mixing blower 56. The mixture (mixture of the first screened defibrated pieces and the additive) is transferred to the depositing section 60 through the tube 54.

The mechanism operable to mix the first screened defibrated pieces and the additive is not particularly limited and may be configured to stir the materials by high speed rotation of the blade or configured to rotate a container like a V mixture. Such a mechanism may be disposed upstream or downstream of the mixing blower 56.

The depositing section 60 is operable to deposit the defibration product obtained in the defibrating section 20. More specifically, the mixture output from the mixing section 50 is introduced into the depositing section 60 through the inlet 62 thereof, and the depositing section 60 disentangles the defibration product in which the fibers are entangled and drops disentangled fibers while dispersing the fibers in the air. Thus, the depositing section 60 uniformly deposits the mixture on the second web forming section 70.

The depositing section 60 includes a drum 61 and a housing (cover) 63 accommodating the drum 61. The drum 61 is a hollow cylindrical sieve rotated by a motor. The drum 61 includes a mesh (filter or screen) functioning as a sieve. The mesh enables fibers and particles smaller than the mesh size (openings) to pass through the drum 61 to fall down. The drum 61 may have the same structure as the drum 41.

The sieve of the drum 61 does not necessarily function to screen a specific substance. More specifically, the sieve used as the drum 61 refers to a member having a mesh, and the drum 61 may allow all the mixture introduced into the drum 61 to fall down.

The second web forming section 70 is disposed under the drum 61. The fibers and the like from the depositing section 60 are deposited on the second web forming section 70 to form a second web W2. The second web forming section 70 includes a mesh belt 72, rollers 74, and a suction mechanism 76.

The mesh belt 72 is an endless belt and supported by a plurality of rollers 74 so as to be moved in the direction indicated by the arrow by the rotation of the rollers 74. The mesh belt 72 may be made of, for example, a metal, a resin, cloth, or a non-woven fabric. The surface of the mesh belt 72 is defined by a mesh having openings with a predetermined size. Very small particles of the fibers and particles falling from the drum 61 and having so small a particle size as can pass through the mesh of the mesh belt 72 fall under the mesh belt 72. The other pieces, that is, the fibers having so large a size as cannot pass through the mesh, are deposited on the mesh belt 72 and transported on the mesh belt 72 in the direction indicated by the arrow. The mesh belt 72 moves at a constant velocity V2 during normal operation for forming the sheet S. The normal operation has been described above.

The mesh size of the mesh belt 72 may be so small as most of the fibers and particles falling from the drum 61 cannot pass through the mesh.

The suction mechanism 76 is disposed under the mesh belt 72, opposite the depositing section 60. The suction mechanism 76 includes a suction blower 77. The sucking of the suction blower 77 causes the suction mechanism 76 to generate a downward air flow in the direction from the depositing section 60 to the mesh belt 72.

The suction mechanism 76 draws the mixture dispersed in the air from the depositing section 60 to accumulate the mixture on the mesh belt 72. Thus, the formation of the second web W2 on the mesh belt 72 is promoted, and the velocity of the mixture discharged from the depositing section 60 is increased. Furthermore, the suction mechanism 76 produces a downward flow in the falling path of the mixture, thus preventing the defibrated pieces from being entangled during falling.

The suction blower 77 (deposition suction member) may be operable to discharge the air sucked from the suction mechanism 76 from the sheet forming apparatus 100 through a collection filter (not shown). Alternatively, the suction blower 77 may be operable to feed the sucked air to the dust collector 27 so that unnecessary particles contained in the air sucked by the suction mechanism 76 can be collected.

Humidified air is fed to the space where the drum 61 is present from the humidifier 208. The humidified air humidifies the interior of the depositing section 60 to reduce static electricity that causes the fibers and particles to attach to the housing 63, thus allowing the fibers and particles to fall readily onto the mesh belt 72, helping form the second web W2 favorably.

Thus, the operations by the depositing section 60 and the second web forming section 70 (web forming step) enable the formation of a fluffy second web W2 containing a large amount of air. The second web W2 deposited on the mesh belt 72 is transported to the sheet forming section 80.

The humidifier 212 feeds air containing a mist to the side downstream of the depositing section 60 in the moving direction of the mesh belt 72. Thus, the mist generated from the humidifier 212 is fed to the second web W2 to control the water content in the second web W2. Thus, static electricity is reduced to keep the fibers from attaching to the mesh belt 72.

The sheet forming apparatus 100 includes a transport unit 79 operable to transport the second web W2 on the mesh belt 72 to the sheet forming section 80. The transport unit 79 may include, for example, a mesh belt 79a, rollers 79b, and a suction mechanism 79c.

The suction mechanism 79c includes a blower (not shown) that generates an upward air flow at the mesh belt 79a by the suction power thereof. The air flow draws the second web W2, so that the second web W2 is removed from the mesh belt 72 and adsorbed to the mesh belt 79a. The mesh belt 79a is moved by the rotation of the roller 79b to transport the second web W2 to the sheet forming section 80. The moving speed of the mesh belt 72 and the moving speed of the mesh belt 79a may be, for example, the same as each other.

Thus, the transport unit 79 is operable to remove the second web W2 from the mesh belt 72 and transports the web.

The sheet forming section 80 forms the deposit in the depositing section 60 into a sheet S. More specifically, the second web W2 (deposit) deposited on the mesh belt 72 and transported by the transport unit 79 is formed into the sheet S by being pressed and heated in the sheet forming section 80. In the sheet forming section 80, heat is applied to the fibers and the additive contained in the defibration product in the second web W2 to bind the fibers in the mixture to each other with the additive (sheet forming binder) therebetween.

The sheet forming section 80 includes a pressing member 82 operable to press the second web W2, and a heating member 84 operable to heat the second web W2 pressed by the pressing member 82.

The pressing member 82 includes a pair of calendar rollers 85 and presses the second web W2 with pinching the web at a predetermined nip pressure. The second web W2 is pressed to reduce the thickness, thus increasing the density of the second web W2. One of the pair of calendar rollers 85 is a driving roller operated by a motor (not shown), and the other is a driven roller. The calendar rollers 85 are rotated by the driving force of the motor to transfer the second web W2 whose density is increased by pressing to the heating member 84.

The heating member 84 may include, a heat roller (heater roller), a heat press, a hot plate, a warm air blower, an infrared heater, or a flash fuser. In the disclosed embodiment, the heating member 84 includes a pair of heat rollers 86. The heat rollers 86 are heated in advance to a predetermined temperature with an internal or external heater. The heat rollers 86 pinch the second web W2 pressed by the calendar rollers 85 and heat the second web W2, thus forming the web into a sheet S.

One of the pair of heat rollers 86 is a driving roller operated by a motor (not shown), and the other is a driven roller. The heat rollers 86 are rotated by the driving force of the motor to transfer the heated sheet S to the cutting section 90.

Thus, the second web W2 formed in the depositing section 60 is formed into the sheet S by being pressed and heated in the sheet forming section 80.

The number of the calendar rollers 85 of the pressing member 82 and the number of the heat rollers 86 of the heating member 84 are not particularly limited.

The cutting section 90 is configured to cut the sheet S formed in the sheet forming section 80. In the embodiment disclosed herein, the cutting section 90 includes a first cutting member 92 operable to cut the sheet S in the direction intersecting the transfer direction of the sheet S, and a second cutting member 94 operable to cut the sheet S in the direction parallel to the transfer direction. The second cutting member 94 may be, for example, cut the sheet S that has passed through the first cutting member 92.

Thus, the sheet S is cut into pieces having predetermined dimensions. The cut pieces of the sheet S (hereinafter referred to as cut sheets S) are ejected to the ejection section 96. The ejection section 96 includes a tray or a stacker in or on which the cut sheets S with predetermined dimensions will be placed.

In an embodiment, the humidifiers denoted by 202, 204, 206, and 208 in the foregoing embodiment may constitute a single evaporation humidifier. In this instance, the single humidifier can be configured to distribute the humidified air generated therefrom to the crushing section 12, the housing 43, the tube 7, and the housing 63. This configuration can be easily achieved by providing the humidifier with a duct (not shown) branched so as to feed humidified air. Alternatively, two or three evaporation humidifiers may act as the humidifiers denoted by 202, 204, 206, and 208.

In an embodiment, also, the humidifiers denoted by 210 and 212 in the above-described embodiment may constitute a single ultrasonic humidifier or may be two independent ultrasonic humidifiers. For example, air containing a mist generated by a humidifier may be distributed to the humidifiers 210 and 212.

Also, while, in the above-described embodiment, the crushing section 12 first crushes the starting material and then the crushed material is formed into the sheet S, an apparatus according to an embodiment may use fibers as the starting material to form the sheet S.

For example, fibers equivalent to the defibrated product defibrated in the defibrating section 20 may be used as the starting material, and such fibers may be introduced into the drum 41. Alternatively, fibers equivalent to the first screened defibrated pieces separated from the defibrated product may be used as the starting material, and such fibers may be introduced into the tube 54. In this instance, fibers prepared from used paper, pulp, or the like may be fed to the sheet forming apparatus 100 to form the sheet S.

The sheet forming apparatus 100 of the disclosed embodiment uses the sheet forming binder disclosed herein to form a highly white, strong sheet. The sheet forming apparatus 100 forms sheets in a dry process. The dry process does not require wastewater treatment and can form sheets with a low environmental load.

5. SHEET FORMING METHOD

The sheet forming method according to an embodiment of the present disclosure including a mixing step of mixing fibers having an average diameter D, a first powder having a volume average particle size d1, and a second powder having a volume average particle size d2 larger than d1 in a gas atmosphere to prepare a mixture, a depositing step of depositing the mixture, and a sheet forming step of forming the mixture deposited in the depositing step into a sheet by heating the mixture. In this method, d1/D is less than 0.350, and d2/D is from 0.350 to 1.000.

In the method of the embodiment disclosed herein, the mixing step of mixing the fibers, the first powder, and the second powder in a gas atmosphere is easily performed in the mixing section 50 of the above-described sheet forming apparatus 100. More specifically, the sheet forming binder including the first powder and the second powder is fed into an air flow containing fragments P (fibers) from the additive feed section 52. The depositing step of depositing the mixture prepared in the mixing section is easily performed in the depositing section 60. The sheet forming step of forming the mixture deposited in the depositing section into a sheet by heating the mixture is easily performed in the sheet forming section 80.

By selecting materials so that d1/D is less than 0.350 and d2/D is from 0.350 to 1.000, the resulting sheet has a high whiteness and a high strength. In the mixing step of the sheet forming method of the disclosed embodiment, the first powder is mixed in a proportion of 10.0% by mass or more relative to the total mass of the first powder and the second powder. Thus, the resulting sheet exhibits further increased whiteness and strength. For example, fibers prepared by defibrating paper in a dry process may be used as the starting material to form a highly white and satisfactorily strong sheet.

6. EXAMPLES

The above-described embodiments of the present disclosure will now be further described in detail with reference to the following Examples. However, the implementation of the disclosed matter is not limited to the Examples. In the following description, "part(s)" and "%" are on a mass basis unless otherwise specified.

6.1. Preparation of First Powder

The following constituents were weighed and mixed in a blender to yield a mixture of polyester resin and titanium dioxide:
(1) Polyester resin (Tg: 58° C., T½: 118° C., molecular weight: 18000), 70 parts by mass; and
(2) Titanium dioxide: 30 parts by mass.

The mixture was kneaded in a twin-screw kneader to yield a kneaded mixture containing the resin and titanium dioxide. The kneaded mixture hardened by cooling was roughly crushed in a hammer mill and then pulverized in a jet mill, followed by screening with a precise air classifier using centrifugal force to yield a powder having a volume average particle size of 6.9 µm. The volume average particle size was measured with a particle size and shape analyzer for suspensions (FPIA-2000 manufactured by Sysmex).

Silicon dioxide fine particles were externally added to the resulting powder in the following proportion with a high-speed mixer to improve the fluidity of the powder:
(1) Powder prepared above: 100 parts by mass; and
(2) Silicon dioxide fine particles: 2 parts by mass.

The resulting powder subjected to the external addition was collected to yield a first powder.

6.2. Preparation of Second Powder

A second powder was prepared in the same manner as the first powder, except for changing the amount of the polyester resin and titanium dioxide as shown below and changing the volume average particle size of the resulting powder to 7 µm:
(1) Polyester resin (Tg: 58° C., T½: 118° C., molecular weight: 18000), 92 parts by mass; and
(2) Titanium dioxide: 8 parts by mass.

6.3. Preparation of Fibers

A monochromatic pattern was printed with a print coverage of 10% on commercially available copy paper with an ink jet printer PX-M7050 (manufactured by Seiko Epson). The thus prepared used paper was defibrated with a high-speed mill to yield defibrated fibers. The diameter (average diameter) of the resulting defibrated fibers was measured with a fiber tester manufactured by Lorentzen & Wettre, and the result was 20.0 µm.

6.4. Formation of Sheet of Example 1

The following materials were weighed out.
(1) Paper fibers defibrated in a dry process: 100 parts by mass
(2) First powder: 5 parts by mass
(3) Second powder: 20 parts by mass The weighed fibers, first powder, and second powder were mixed together in a gas atmosphere. The resulting mixture was deposited onto a glass plate through a stainless steel sieve of 200 mm in diameter having a mesh size of 0.6 mm until the deposited mixture forms a sheet. The sheet of the deposited mixture was pressed at a pressure of 200 kgf/cm² for 30 s. This pressing operation compresses the deposited mixture containing the fibers and the binder to increase the density of the sheet of the deposited mixture to make the sheet readily formable. The sheet was subjected to heat press at a temperature of 150° C. and a pressure of 400 kgf/cm² for 20 s. Thus, the binder was melted to bind the fibers to each other to yield a sheet having a density of about 0.8 g/cm³.

6.5. Formation of Sheets of Other Examples

The sheet of Example 2 was formed in the same manner as in Example 1 except for changing the volume average particle size of the first powder to 5.0 μm and the volume average particle size of the second powder to 10.0 μm.

The sheet of Example 3 was formed in the same manner as in Example 1 except for changing the proportion of the first powder to 2.5 parts by mass and the proportion of the second powder to 22.5 parts by mass.

The sheet of Example 4 was formed in the same manner as in Example 1 except for changing the volume average particle size of the second powder to 15.0 μm.

The sheet of Example 5 was formed in the same manner as in Example 1 except for changing the volume average particle size of the second powder to 20.0 μm.

The sheet of Example 6 was formed in the same manner as in Example 1 except for changing the proportion of the polyester resin in the second powder to 100.0 parts by mass and the proportion of titanium dioxide to 0.0 parts by mass.

The sheet of Example 7 was formed in the same manner as in Example 1 except for changing the proportion of the polyester resin in the first powder to 69.5 parts by mass and adding 0.5 part by mass of fluorescent brightening agent to the first powder.

The sheet of Example 8 was formed in the same manner as in Example 1 except for changing the volume average particle size of the first powder to 10.0 μm and the volume average particle size of the second powder to 15.0 μm.

The sheet of Example 9 was formed in the same manner as in Example 1 except for changing the volume average particle size of the first powder to 10.0 μm and the volume average particle size of the second powder to 20.0 μm.

The sheet of Example 10 was formed in the same manner as in Example 1 except for changing the volume average particle size of the first powder to 15.0 μm and the volume average particle size of the second powder to 20.0 μm.

The sheet of Example 11 was formed in the same manner as in Example 1 except for changing the proportion of the first powder to 12.5 parts by mass and the proportion of the second powder to 12.5 parts by mass.

The sheet of Example 12 was formed in the same manner as in Example 1 except for using fibers defibrated in the dry process having a diameter of 50.0 μm and changing the volume average particle size of the first powder to 5 μm and the volume average particle size of the second powder to 30.0 μm.

The sheet of Example 13 was formed in the same manner as in Example 1 except for using fibers defibrated in the dry process having a diameter of 50.0 μm and changing the volume average particle size of the first powder to 10.0 μm and the volume average particle size of the second powder to 30.0 μm.

6.6. Formation of Sheets of Comparative Examples

The sheet of Comparative Example 1 was formed in the same manner as in Example 1 except for changing the proportion of the first powder to 25.0 parts by mass and the proportion of the second powder to 0.0 parts by mass. The volume average particle size of the first powder was 6.9 μm.

The sheet of Comparative Example 2 was formed in the same manner as in Example 1 except for changing the proportion of the polyester resin in the second powder to 100.0 parts by mass and the proportion of titanium dioxide to 0.0 parts by mass, and changing the proportion of the first powder to 0.0 parts by mass and the proportion of the second powder to 25.0 parts by mass. The volume average particle size of the second powder was 7 μm.

The sheet of Comparative Example 3 was formed in the same manner as in Example 1 except for changing the proportion of the first powder to 1.25 parts by mass and the proportion of the second powder to 23.75 parts by mass.

6.7. Relationship Between Volume Average Particle Size d of Powders and Average Diameter D of Fibers The values of d1/D and d2/D in each of the Examples and Comparative Examples are shown in the Table, wherein d1 represents the volume average particle size of the first powder, d2 represents the volume average particle size of the second powder, and D represents the average diameter of the fibers.

6.8. Whiteness of the Sheets

The ISO whiteness of the sheets formed in the Examples and Comparative Examples was measured with PF7000 manufactured by Nippon Denshoku Industries. The whiteness of each sheet relative to the ISO whiteness of the sheet of Comparative Example 1 defined as 100 was rated according to the following criteria. When the relative whiteness is 85 or more, the sheet is considered to be good in terms of whiteness.

5: Relative whiteness is 95 or more.
4: Relative whiteness is from 90 to less than 95.
3: Relative whiteness is from 85 to less than 90.
2: Relative whiteness is from 70 to less than 85.
1: Relative whiteness is less than 70.

The results are shown in the Table.

6.9. Strength of the Sheets

The tensile index of the sheets of the Examples and Comparative Examples was measured in accordance with JIS P 8113: 2006, Paper and board—Determination of tensile properties—Part 2: Constant rate of elongation method. The tensile index of each sheet relative to the tensile index of the sheet of Comparative Example 2 defined as 100 was rated according to the following criteria. When the relative tensile index is 80 or more, the sheet is considered to be good in terms of strength.

5: Relative tensile index is 90 or more.
4: Relative tensile index is from 85 to less than 90.
3: Relative tensile index is from 80 to less than 85.
2: Relative tensile index is from 70 to less than 80.
1: Relative tensile index is less than 70.

TABLE

| | 1st Powder Volume average particle size d1 [μm] | Titanium dioxide content [mass part(s)] | Fluorescent brightening agent content [mass part(s)] | 2nd Powder Volume average particle size d2 [μm] | Titanium dioxide content [mass part(s)] | Fiber diameter D [μm] | d1/D | d2/D | Proportion of 1st powder [mass part(s)] | Proportion of 2nd powder [mass part(s)] | Sheet strength | Whiteness |
|---|---|---|---|---|---|---|---|---|---|---|---|---|
| Example 1 | 6.9 | 30.0 | 0.0 | 7.0 | 8.0 | 20.0 | 0.345 | 0.35 | 5.0 | 20.0 | 4 | 4 |
| Example 2 | 5.0 | 30.0 | 0.0 | 10.0 | 8.0 | 20.0 | 0.25 | 0.5 | 5.0 | 20.0 | 5 | 5 |
| Example 3 | 6.9 | 30.0 | 0.0 | 7.0 | 8.0 | 20.0 | 0.345 | 0.35 | 2.5 | 22.5 | 5 | 3 |
| Example 4 | 6.9 | 30.0 | 0.0 | 15.0 | 8.0 | 20.0 | 0.345 | 0.75 | 5.0 | 20.0 | 4 | 4 |
| Example 5 | 6.9 | 30.0 | 0.0 | 20.0 | 8.0 | 20.0 | 0.345 | 1 | 5.0 | 20.0 | 3 | 4 |
| Example 6 | 6.9 | 30.0 | 0.0 | 7.0 | 0.0 | 20.0 | 0.345 | 0.35 | 5.0 | 20.0 | 4 | 4 |

TABLE-continued

| | 1st Powder Volume average particle size d1 [μm] | Titanium dioxide content [mass part(s)] | Fluorescent brightening agent content [mass part(s)] | 2nd Powder Volume average particle size d2 [μm] | Titanium dioxide content [mass part(s)] | Fiber diameter D [μm] | d1/D | d2/D | Proportion of 1st powder [mass part(s)] | Proportion of 2nd powder [mass part(s)] | Sheet strength | Whiteness |
|---|---|---|---|---|---|---|---|---|---|---|---|---|
| Example 7 | 6.9 | 30.0 | 0.5 | 7.0 | 8.0 | 20.0 | 0.345 | 0.35 | 5.0 | 20.0 | 4 | 5 |
| Example 8 | 10.0 | 30.0 | 0.0 | 15.0 | 8.0 | 20.0 | 0.5 | 0.75 | 5.0 | 20.0 | 3 | 2 |
| Example 9 | 10.0 | 30.0 | 0.0 | 20.0 | 8.0 | 20.0 | 0.5 | 1 | 5.0 | 20.0 | 4 | 2 |
| Example 10 | 15.0 | 30.0 | 0.0 | 20.0 | 8.0 | 20.0 | 0.75 | 1 | 5.0 | 20.0 | 3 | 2 |
| Example 11 | 6.9 | 30.0 | 0.0 | 7.0 | 8.0 | 20.0 | 0.345 | 0.35 | 12.5 | 12.5 | 2 | 5 |
| Example 12 | 5.0 | 30.0 | 0.0 | 30.0 | 8.0 | 50.0 | 0.1 | 0.6 | 5.0 | 20.0 | 5 | 4 |
| Example 13 | 10.0 | 30.0 | 0.0 | 30.0 | 8.0 | 50.0 | 0.2 | 0.6 | 5.0 | 20.0 | 5 | 3 |
| Comparative Example 1 | 6.9 | 30.0 | 0.5 | — | — | 20.0 | 0.345 | — | 25.0 | 0.0 | 1 | 5 |
| Comparative Example 2 | — | — | — | 7.0 | 0.0 | 20.0 | — | 0.35 | 0.0 | 25.0 | 5 | 1 |
| Comparative Example 3 | 6.9 | 30.0 | 0.0 | 7.0 | 8.0 | 20.0 | 0.345 | 0.35 | 1.25 | 23.75 | 5 | 1 |

6.10. Conclusion

The results shown in the Table suggest that the sheets of the Examples, which contain the first powder with a content of 10.0% by mass or more and the second powder having a larger volume average particle size than the first powder exhibited high strength and high whiteness. In contrast, the sheets of Comparative Examples 1 and 2 in which either the first powder or the second powder is not contained and the sheet of Comparative Example 3 in which the first powder content was 5.0% by mass were insufficient in terms of sheet strength or whiteness.

Also, when the constituents of a sheet had a d1/D value of 0.350 and a d2/D value in the range of 0.350 to 1.000, the strength and the whiteness of the sheet were superior to those of the sheet whose constituents did not satisfy such values.

The implementation of the matter disclosed herein is not limited to the above-described embodiments, and various modifications may be made. For example, the subject matter disclosed herein may be implemented in substantially the same manner as any of the disclosed embodiments (for example, in terms of function, method, and results, or in terms of purpose and effect). Some elements used in the disclosed embodiments but not essential may be replaced. Implementations producing the same effect as produced in the disclosed embodiments or achieving the same object as in the disclosed embodiments are also within the scope of the subject matter of the present disclosure. The forms of the disclosed embodiments may be combined with the known art.

What is claimed is:

1. A sheet forming binder comprising:
   a first powder; and
   a second powder having a larger volume average particle size than the first powder,
   wherein the proportion of the first powder is 10.0% by mass or more relative to the total mass of the first powder and the second powder,
   the first powder is in a state where particles of an inorganic pigment are bound to each other with a resin, and
   the second powder is in a state where particles of an inorganic pigment are bound to each other with a resin.

2. The sheet forming binder according to claim 1, wherein the first powder contains a fluorescent brightening agent.

3. The sheet forming binder according to claim 2, wherein the first powder contains the fluorescent brightening agent with a content of 1% by mass or less relative to the total mass of the first powder.

4. The sheet forming binder according to claim 1, wherein the first powder has a volume average particle size of 5.0 μm or less, and the second powder has a volume average particle size of 10.0 μm or more.

5. The sheet forming binder according to claim 1, wherein the first powder contains titanium dioxide as the inorganic pigment with a content of 30.0% by mass or more.

6. The sheet forming binder according to claim 1, wherein the second powder contains titanium dioxide as the inorganic pigment with a content of 8.0% by mass or less.

* * * * *